(12) United States Patent  
Sugita

(10) Patent No.: US 7,436,488 B2
(45) Date of Patent: Oct. 14, 2008

(54) WIDE-ANGLE LENS AND ZOOM LENS

(75) Inventor: Shigenobu Sugita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 11/408,730

(22) Filed: Apr. 20, 2006

(65) Prior Publication Data

US 2006/0244939 A1    Nov. 2, 2006

(30) Foreign Application Priority Data

Apr. 28, 2005 (JP) .............................. 2005-131837

(51) Int. Cl.
 *G03B 27/54* (2006.01)
 *G03B 27/42* (2006.01)
(52) U.S. Cl. .......................................... 355/53; 355/67
(58) Field of Classification Search ...................... None
 See application file for complete search history.

(56) References Cited

U.S. PATENT DOCUMENTS 6,028,715 A    2/2000    Takamoto et al.

2005/0036206 A1*  2/2005  Wada .......................... 359/676
2005/0200967 A1*  9/2005  Yamasaki et al. ........... 359/676
2006/0023320 A1    2/2006  Kimura et al.
2006/0061872 A1*  3/2006  Yamasaki .................... 359/680

FOREIGN PATENT DOCUMENTS

| JP | 10-161027 A | 6/1998 |
| JP | 2001-215411 A | 8/2001 |
| JP | 2002-131639 A | 5/2002 |
| JP | 2004-138678 A | 5/2004 |

* cited by examiner

*Primary Examiner*—Hung Henry Nguyen
*Assistant Examiner*—Mesfin T Asfaw
(74) *Attorney, Agent, or Firm*—Canon U.S.A., Inc., IP Division

(57) ABSTRACT

At least one exemplary embodiment is directed to a projection optical system which includes at least one prism and at least one positive lens. In a projection lens included in the projection optical system, the dispersion properties of the prism and the positive lens are set such that chromatic aberration occurring in the at least one prism can be appropriately corrected and/or reduced by using the at least one positive lens.

20 Claims, 10 Drawing Sheets

THIRD NUMERICAL EXAMPLE AXIAL CHROMATIC ABERRATION

WIDE-ANGLE LENS AND ZOOM LENS

BACKGROUND OF THE INVENTION

1. Field of the Invention

The present invention relates to projection optical systems, and more specifically though not exclusively, to a projection optical system configured to enlarge and project an image formed by using an optical modulator onto a projection plane.

2. Description of the Related Art

Liquid crystal projectors for forming images by using optical modulators (e.g., liquid-crystal display elements) and projecting the images onto projection planes (e.g., screens) have been variously proposed.

In particular, liquid crystal projectors have become widely used in conferences, presentations, and other scenes as devices that project images in personal computers on a large screen to allow the image to be viewed.

Liquid crystal projectors can be classified into three-panel and single-panel (time division optical modulation method). In three-panel projectors, a plurality of liquid-crystal display elements, one element corresponding to a red, green, or blue light component, are used, and the color light components are combined and then projected onto a screen through a single projection lens set. In single-panel projectors, a single liquid-crystal display element is used, light modulations for three colors (red, green, and blue) are displayed in a time division manner, and an optical image corresponding to each color is formed onto a screen while being synchronized with color changes of light emitted from the liquid-crystal display element.

For such a liquid crystal projector, when an image formed by using a liquid-crystal display element is projected onto a screen, if a letter image or other specific image appears as a double image, resolution and quality are degraded. To avoid the degradation of image quality, it can be necessary in some circumstances to sufficiently combine pixels corresponding to colors over the full area of the screen. Therefore, it can be necessary in some circumstances to sufficiently correct and/or reduce the color shift (lateral chromatic aberration, or chromatic difference of magnification) occurring in a projection lens over the full range of visible light.

These days, a higher definition image is increasingly desired, and this imposes rigid requirements for chromatic aberration. Therefore, the chromatic aberration is corrected or error reduced by using an anomalous dispersion glass material or other similar materials. For example, Japanese Patent Laid-Open Nos. 2001-215411 and 2004-138678 discuss techniques that sufficiently correct and/or reduce chromatic aberration properties by largely using an anomalous dispersion glass material.

However, the techniques discussed in the above patent documents can be insufficient in some cases in terms of size and weight because generally a compact and lightweight lens system is required as a projection lens employed in a liquid crystal projector.

SUMMARY OF THE INVENTION

At least one exemplary embodiment is directed to a projection optical system configured to enlarge and project an image formed by using an optical modulator (e.g., liquid-crystal display element) onto a projection plane (e.g., screen) and to a system useful for an image projecting apparatus using the projection optical system.

According to a first exemplary embodiment, a projection optical system includes at least one optical element and at least one positive lens. In the projection optical system, the following expressions can be satisfied:

$$0.02 < \Sigma_i \{(Nf)i - (Nc)i\} \times Di/f < 0.15$$

$$\theta p, av - (0.648 - 0.001682 \times vp, av) > 0$$

$$\theta p, av - (0.589 - 0.000584 \times vp, av) < 0$$

where $$\theta p = \{(Ng)p - (Nf)p\}/\{(Nf)p - (Nc)p\}$$

$$\theta p, av = \Sigma_p (\theta p/fp)/\Sigma_p (1/fp)$$

$$vp, av = \Sigma_p (vp/fp)/\Sigma_p (1/fp)$$

where (Nf)i represents a refractive index of a material of an ith optical element for a F-line, the ith optical element being counted from an enlargement conjugate side in the projection optical system among the at least one optical element; (Nc)i represents a refractive index of the material of the ith optical element for a C-line; Di represents a material thickness of the ith optical element along an optical axis, where the value of Di is positive when a ray bundle that has passed through the ith optical element converges and the value of Di is negative when the ray bundle diverges; f represents a focal length of the projection optical system; fp represent a focal length of a pth positive lens, the pth positive lens being counted from the enlargement conjugate side in the projection optical system among the at least one positive lens; vp represents an Abbe number of a material of the pth positive lens for a d-line; (Ng)p represents a refractive index of the pth positive lens for a g-line; (Nf)p represents a refractive index of the pth positive lens for the F-line; and (Nc)p represents a refractive index of the pth positive lens for the C-line.

According to a second exemplary embodiment, an image projecting apparatus includes at least one image display element and a projection optical system configured to project light from the at least one-image display element. The projection optical system includes at least one optical element and at least one positive lens. In the projection optical system, the following expressions can be satisfied:

$$0.02 < \Sigma_i \{(Nf)i - (Nc)i\} \times Di/f < 0.15$$

$$\theta p, av - (0.648 - 0.001682 \times vp, av) > 0$$

$$\theta p, av - (0.589 - 0.000584 \times vp, av) < 0$$

where $$\theta p = \{(Ng)p - (Nf)p\}/\{(Nf)p - (Nc)p\}$$

$$\theta p, av = \Sigma_p (\theta p/fp)/\Sigma_p (1/fp)$$

$$vp, av = \Sigma_p (vp/fp)/\Sigma_p (1/fp)$$

where (Nf)i represents a refractive index of a material of an ith optical element for a F-line, the ith optical element being counted from an enlargement conjugate side in the projection optical system among the at least one optical element; (Nc)i represents a refractive index of the material of the ith optical element for a C-line; Di represents a material thickness of the ith optical element along an optical axis, where the value of Di is positive when a ray bundle that has passed through the ith optical element converges and the value of Di is negative when the ray bundle diverges; f represents a focal length of the projection optical system; fp represent a focal length of a pth positive lens, the pth positive lens being counted from the enlargement conjugate side in the projection optical system among the at least one positive lens; νp represents an Abbe number of a material of the pth positive lens for a d-line; (Ng)p represents a refractive index of the pth positive lens for a g-line; (Nf)p represents a refractive index of the pth positive lens for the F-line; and (Nc)p represents a refractive index of the pth positive lens for the C-line.

Further features of the present invention will become apparent from the following description of exemplary embodiments with reference to the attached drawings.

DESCRIPTION OF THE EMBODIMENTS

Figure 1:
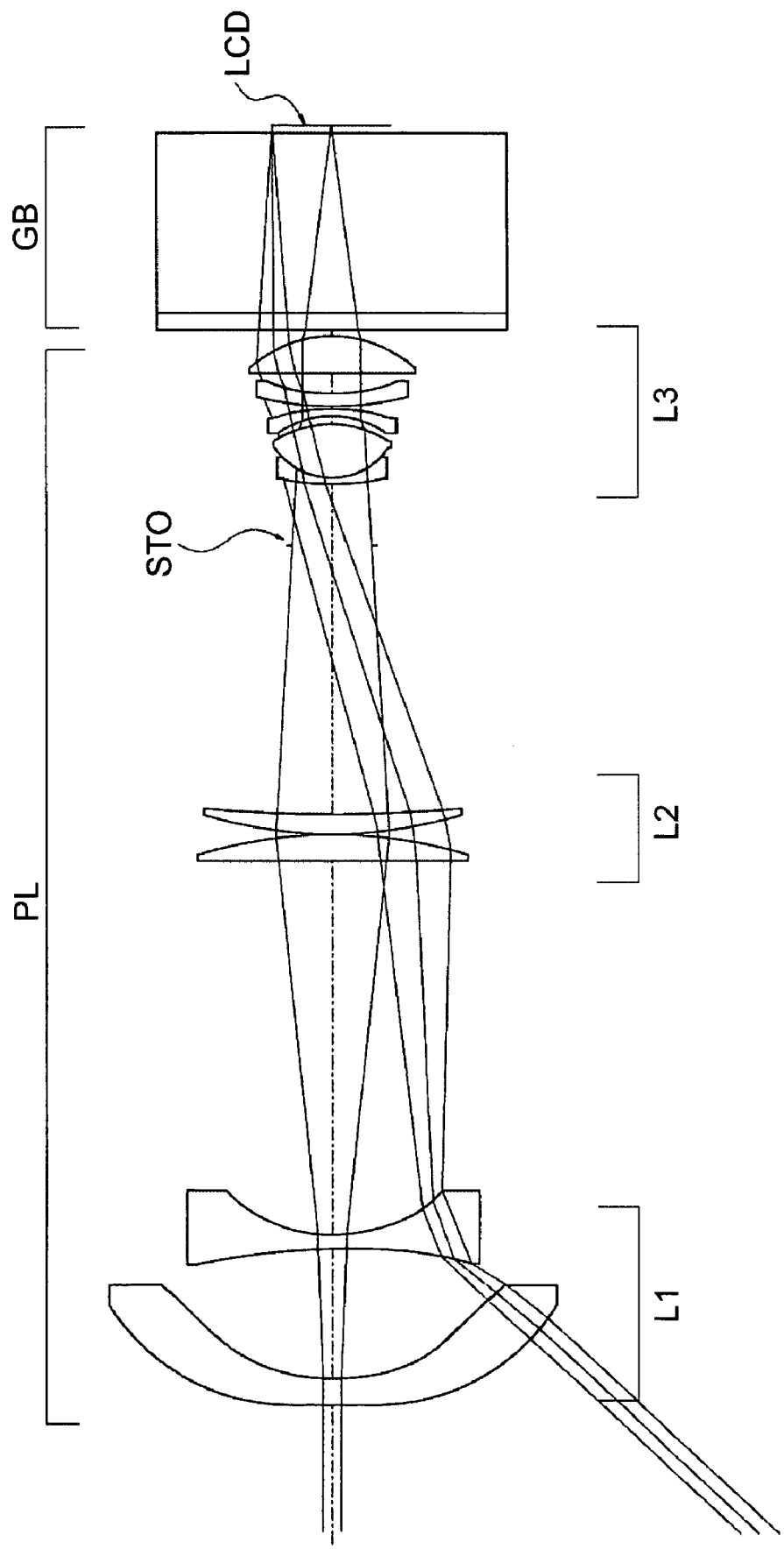
FIG. 1 illustrates a schematic structure of an image projection apparatus using a projection lens according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the refractive index values, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

A projection optical system according to exemplary embodiments of the present invention provides a projection lens system that is more compact and lightweight than conventional lens systems and that sufficiently reduces lateral chromatic aberration.

A projection optical system (which includes a projection lens PL and a glass block GB) according to exemplary embodiments of the present invention is an optical system that establishes a substantially conjugate relationship between an image display element LCD (e.g., reflective liquid-crystal display element) and a projection plane (e.g., screen) and is configured to enlarge and project an image formed by the image display element onto the projection plane. The projection plane is disposed at a conjugate point, which can have a longer distance (a first conjugate point, or enlargement conjugate point), and the image display element LCD is disposed at a conjugate point, which can have a shorter distance (a second conjugate point, or reduction conjugate point).

First to third exemplary embodiments of the projection optical system and an image projecting apparatus using the projection optical system are described below with reference to the attached drawings.

Figure 2:
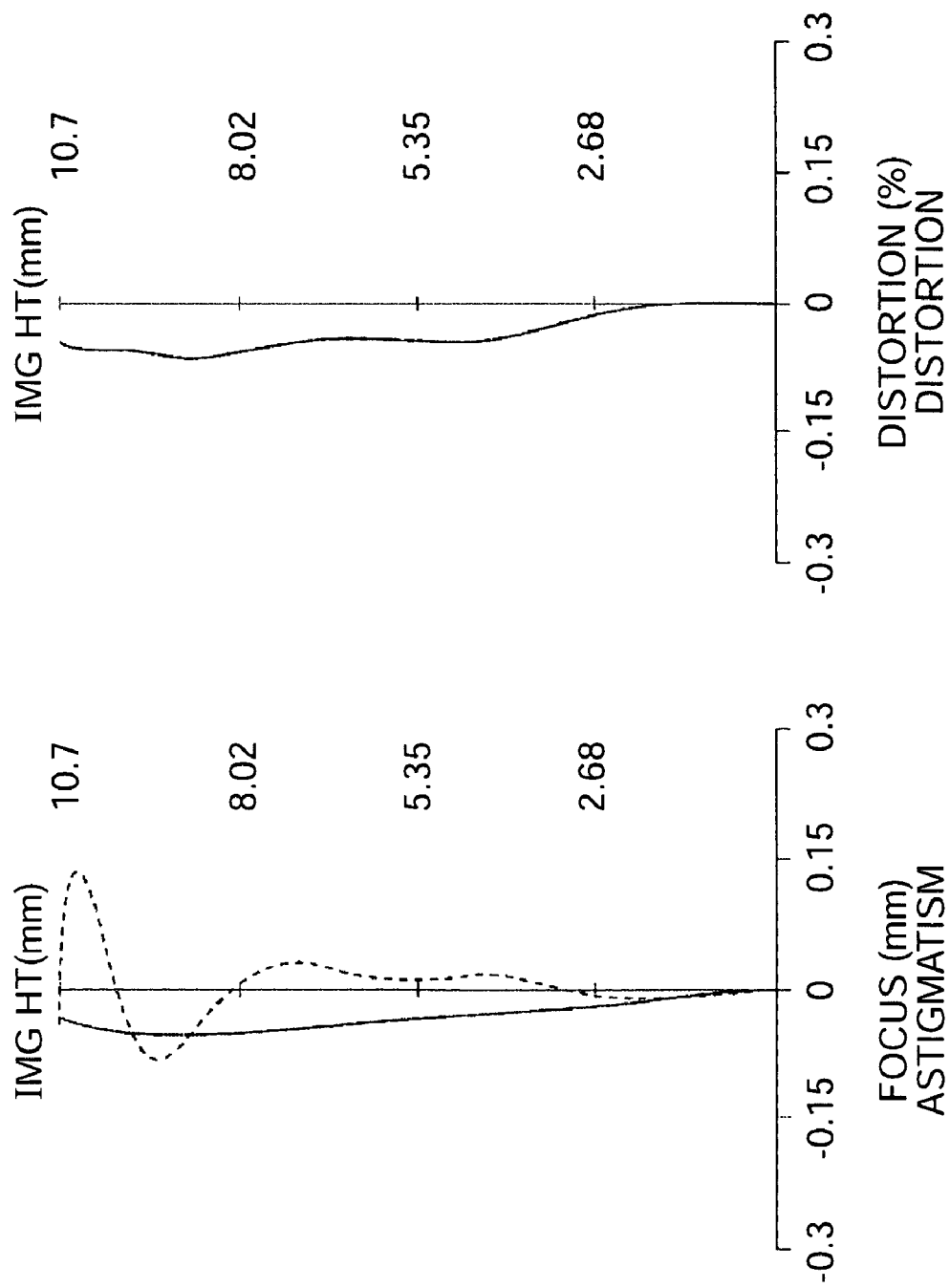
FIG. 2 illustrates aberrations in the projection lens according to a first numerical example where the object distance is 660 mm.
Figure 3:
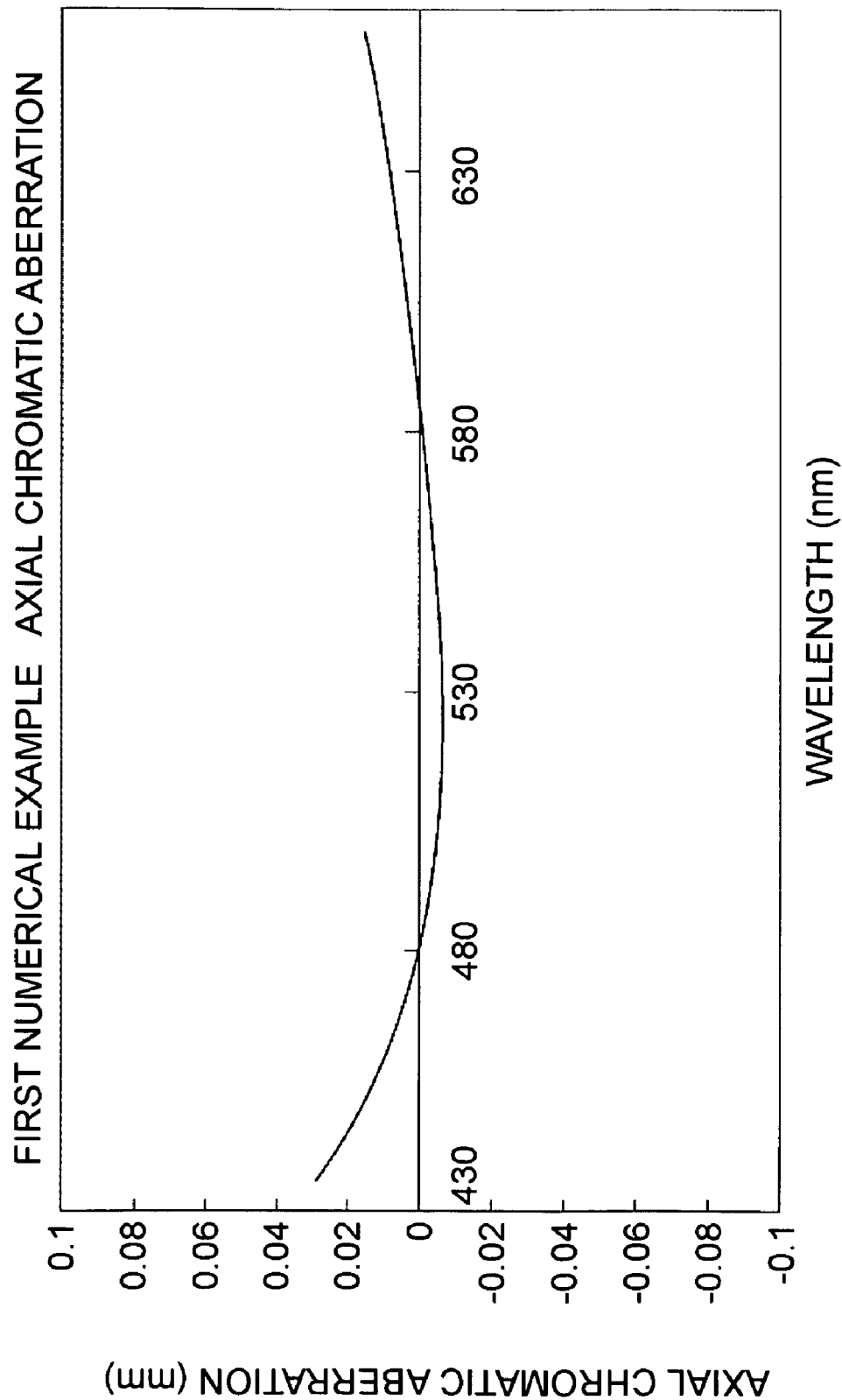
FIG. 3 illustrates an axial (longitudinal) chromatic aberration in the projection lens according to the first numerical example where the object distance is 660 mm.

FIGS. 1 to 3 and Table 1 correspond to a first numerical example (of the first exemplary embodiment). FIG. 1 illustrates a schematic structure of an image projecting apparatus (e.g., liquid crystal projector) using a projection lens (e.g., wide-angle lens) PL according to the first numerical example. FIG. 2 illustrates aberrations in the projection lens according to the first numerical example (the units in the first numerical example are expressed in millimeters) where the object distance is 660 mm. FIG. 3 illustrates an axial (longitudinal) chromatic aberration therein.

Figure 4:
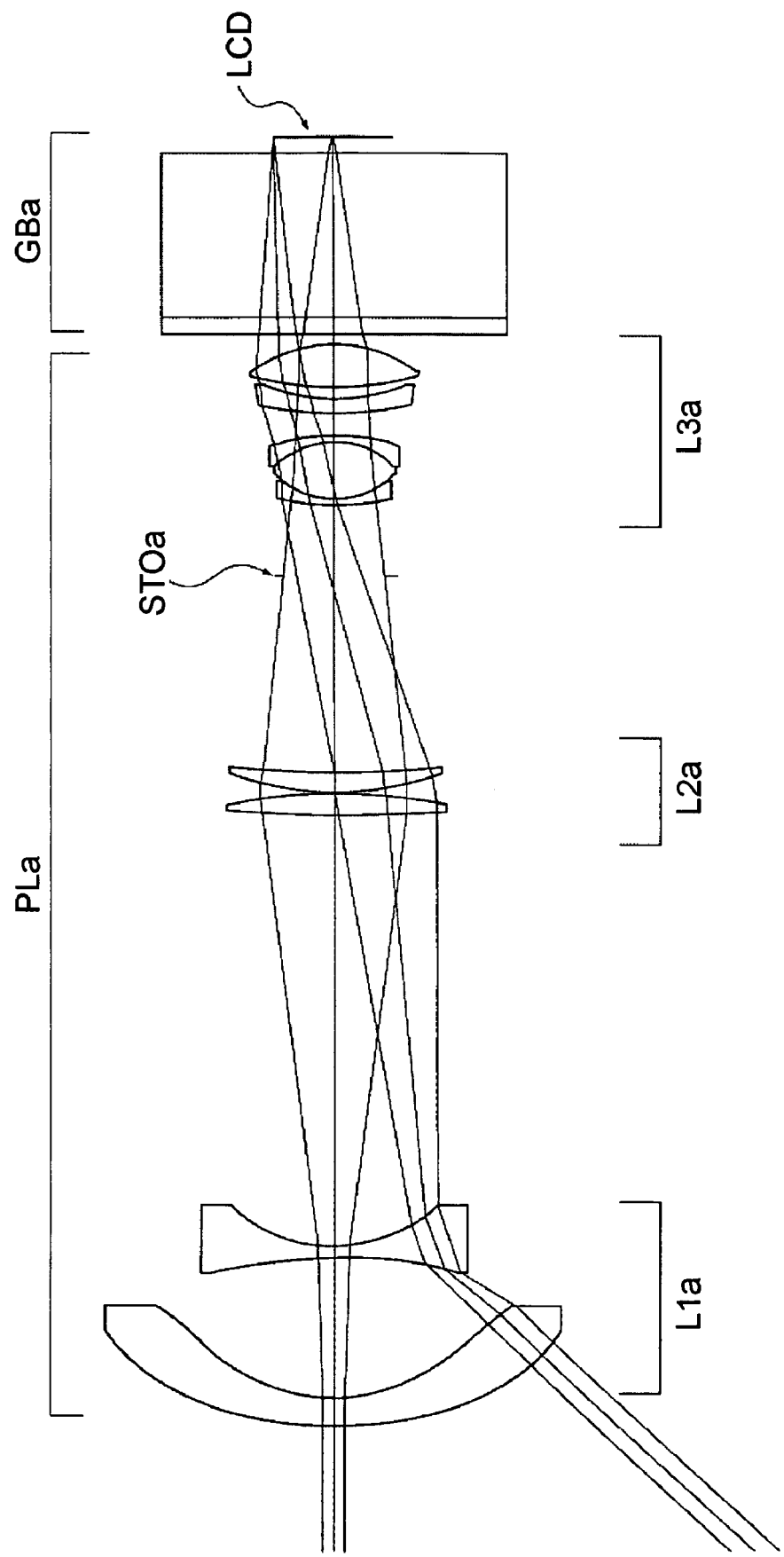
FIG. 4 illustrates a schematic structure of an image projection apparatus using a projection lens according to a second exemplary embodiment of the present invention.
Figure 5:
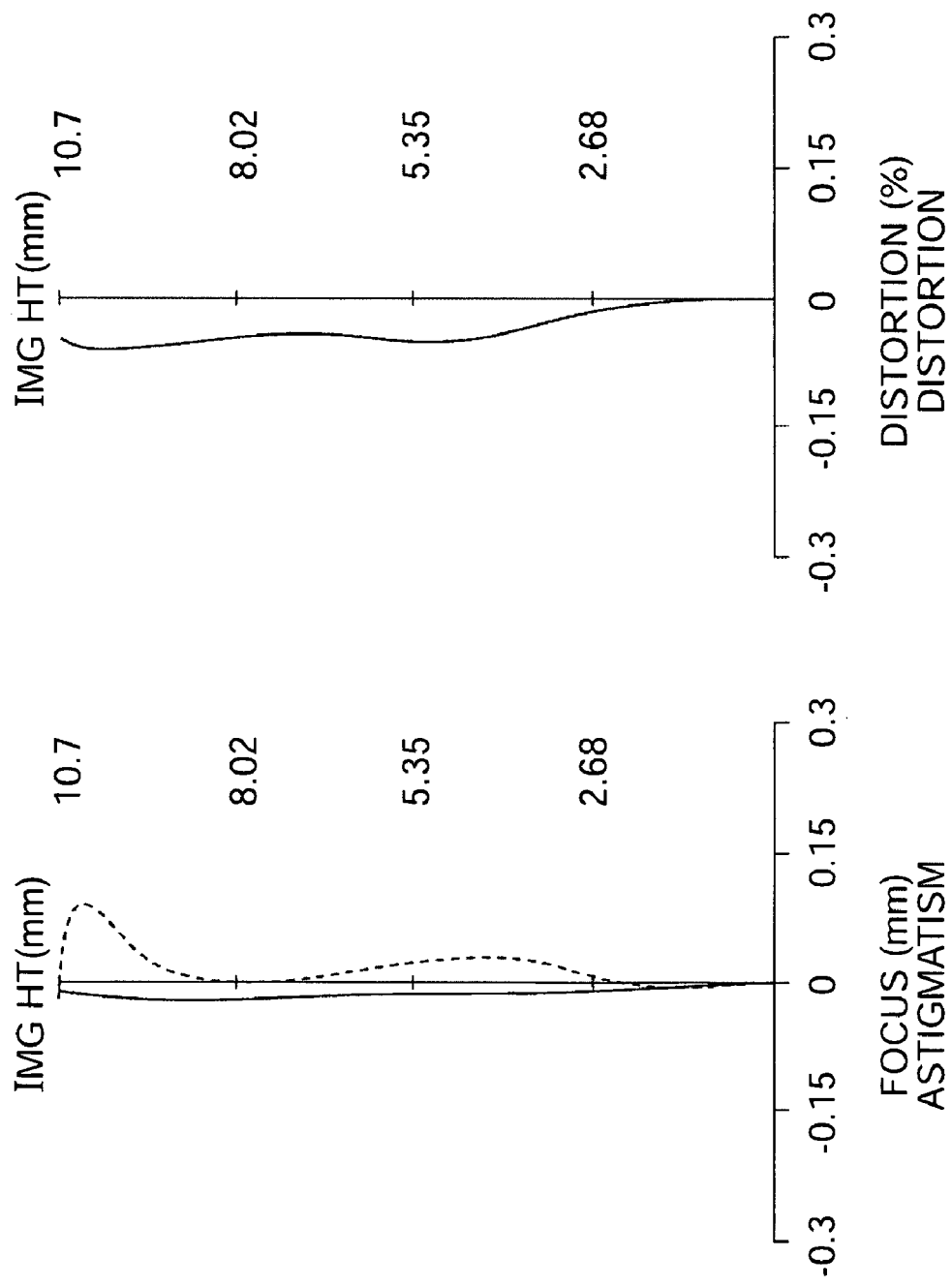
FIG. 5 illustrates aberrations in the projection lens according to a second numerical example where the object distance is 660 mm, when the second numerical example is expressed in millimeters.
Figure 6:
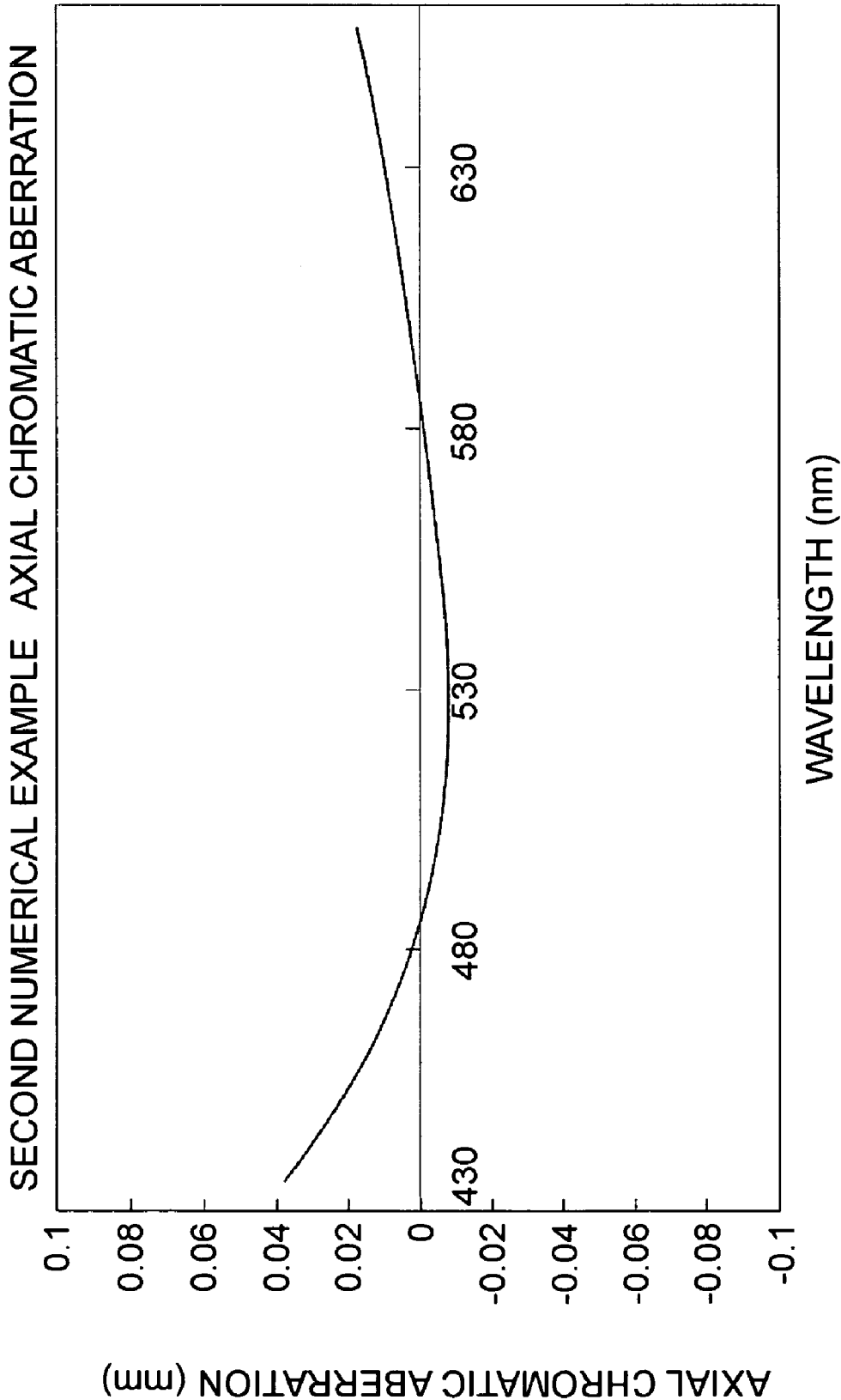
FIG. 6 illustrates an axial chromatic aberration in the projection lens according to the second numerical example where the object distance is 660 mm, when the second numerical example is expressed in millimeters.

FIGS. 4 to 6 and Table 2 correspond to a second numerical example (of the second exemplary embodiment). FIG. 4 illustrates a schematic structure of an image projecting apparatus (e.g., liquid crystal projector) using a projection lens PL according to the second numerical example. FIG. 5 illustrates aberrations in the projection lens according to the second numerical example (the units in the second numerical example are expressed in millimeters) where the object distance is 660 mm. FIG. 6 illustrates an axial chromatic aberration therein.

Figure 7:
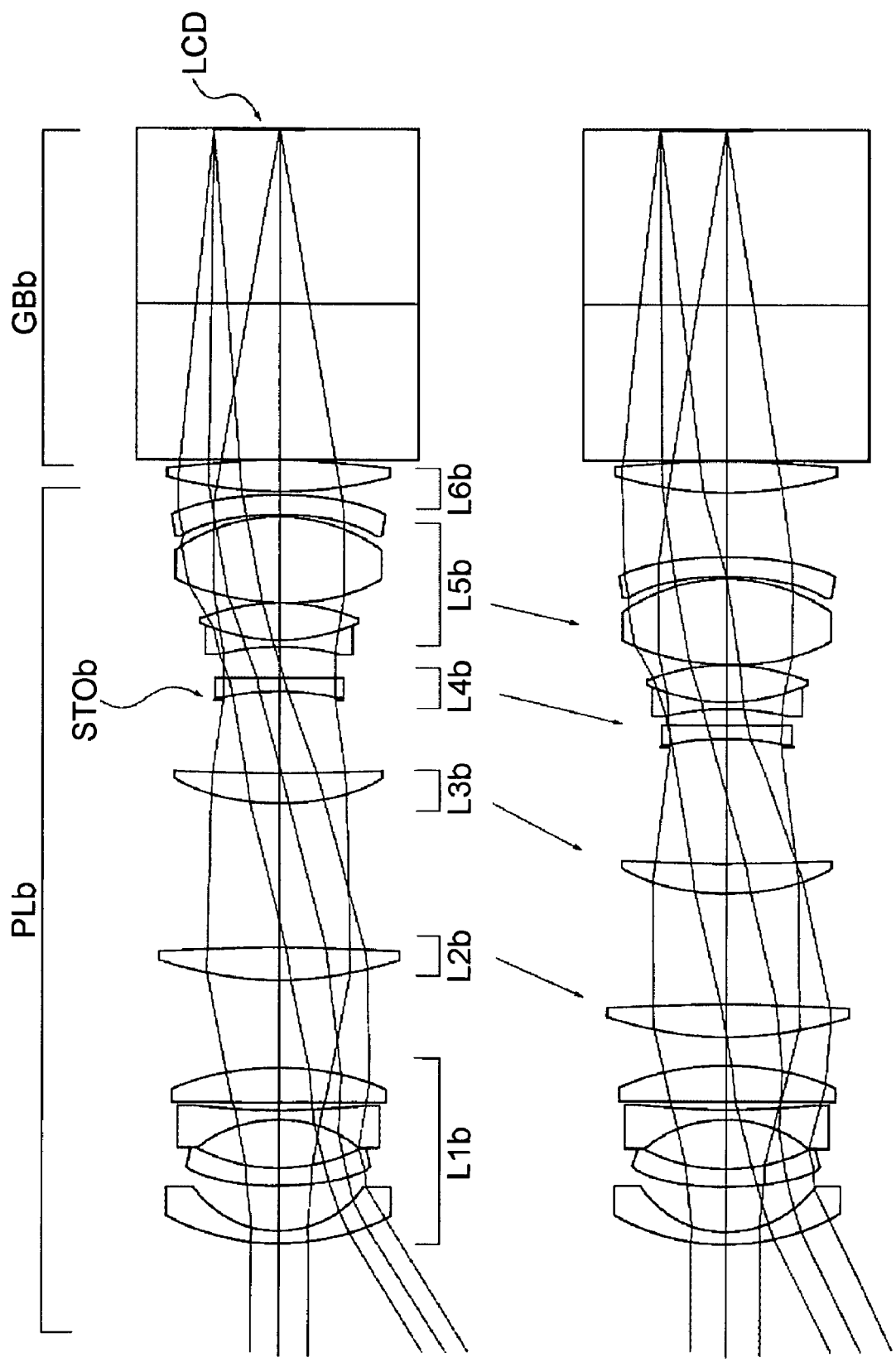
FIG. 7 illustrates a schematic structure of an image projection apparatus using a zoom lens according to a third exemplary embodiment of the present invention.
Figure 8:
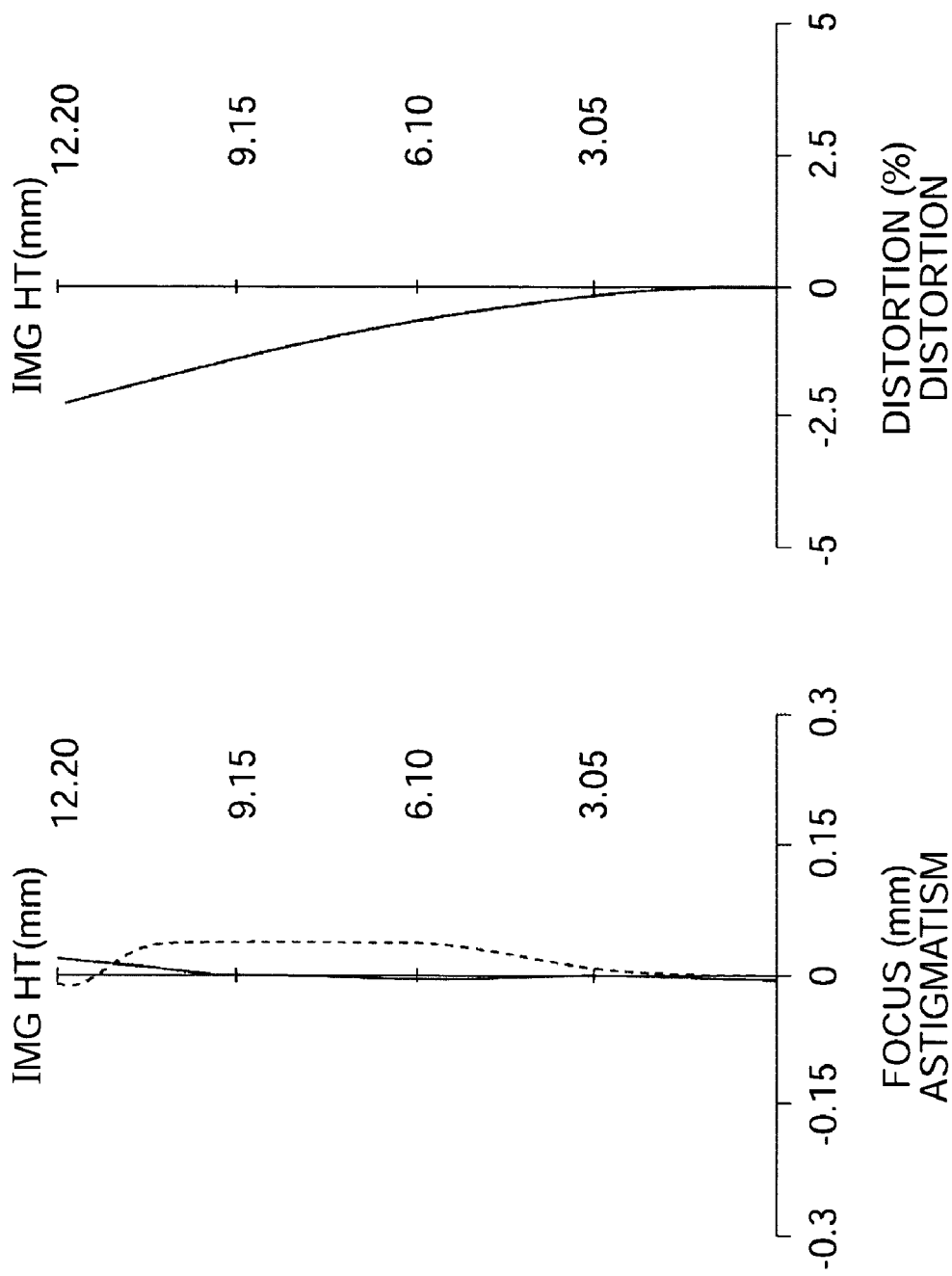
FIG. 8 illustrates aberrations in the projection lens according to a third numerical example at the wide-angle end where the object distance is 2100 mm.
Figure 9:
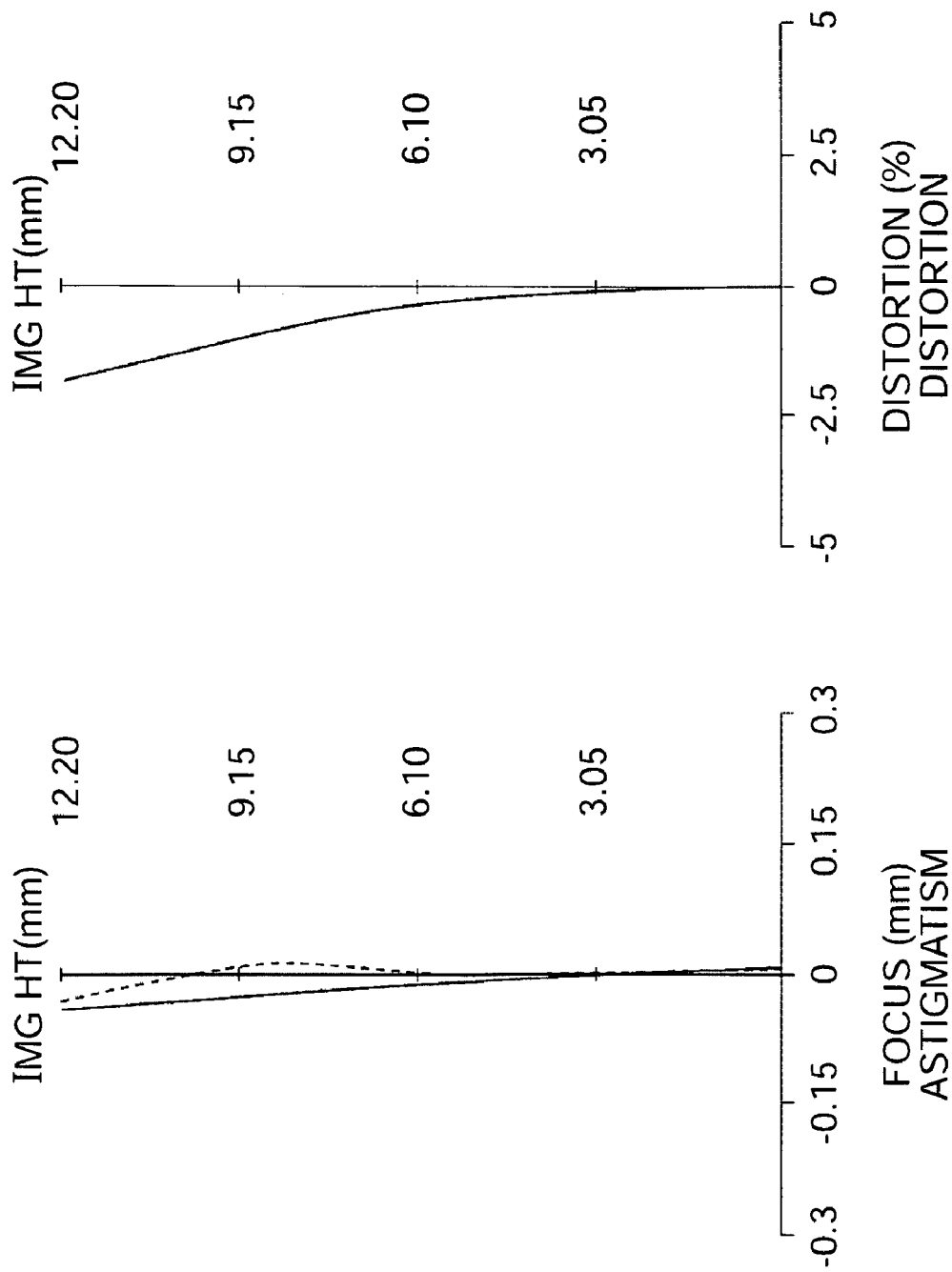
FIG. 9 illustrates aberrations in the projection lens according to the third numerical example at the telephoto end where the object distance is 2100 mm.
Figure 10:
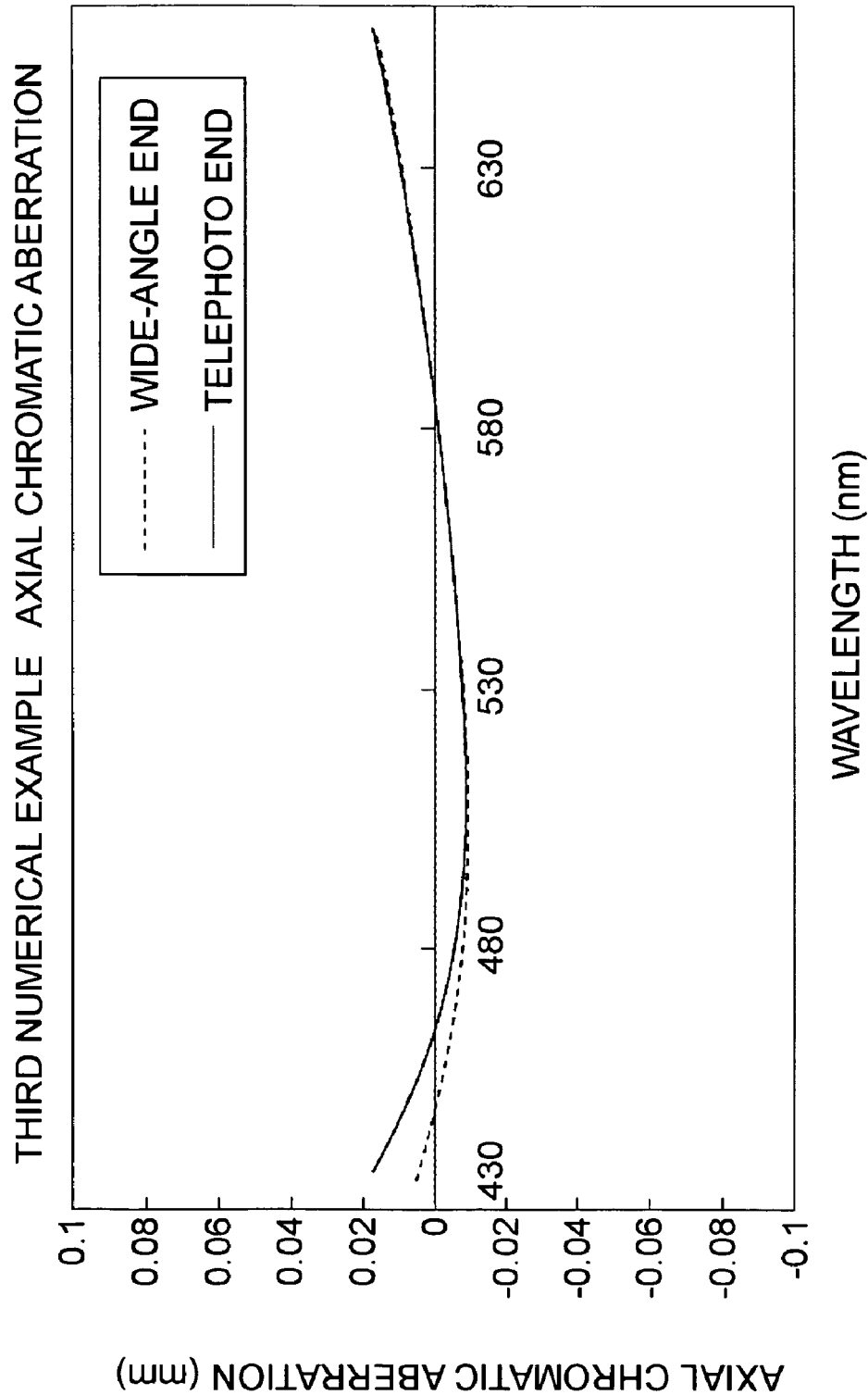
FIG. 10 illustrates axial chromatic aberrations in the projection lens according to the third numerical example at the wide-angle end and the telephoto end where the object distance is 2100 mm.

FIGS. 7 to 10 and Table 3 correspond to a third numerical example (of the third exemplary embodiment). FIG. 7 illustrates a schematic structure of an image projecting apparatus (e.g., liquid crystal projector) using a projection lens (e.g., zoom lens) PL according to the third numerical example. FIGS. 8 and 9 illustrate aberrations in the projection lens according to the third numerical example (the scale is in millimeters) at the wide-angle end (FIG. 8) and the telephoto end (FIG. 9) where the object distance is 2100 mm. FIG. 10 illustrates an axial chromatic aberration therein.

Table 4 lists the values of conditions for first to third numerical examples. The numerical values shown in Tables 1 to 3 are expressed in millimeters.

In the numerical examples, a surface number i represents the order of a surface from the enlargement side, (r)i represents the radius of curvature of an ith optical surface (ith surface), (d)i represents the surface distance between the ith surface and an (i+1)-th surface, (Nd)i represents the refractive index of an optical member defined between the ith surface and (i+1)-th surface for d-line, (νd)i represents the Abbe number of the optical member defined between the ith surface and (i+1)-th surface for the d-line, (f)i represents the focal length of the ith optical member, and (θgF)i represents the anomalous dispersion value in the ith optical member when θgF=(Ng−Nf)/(Nf−Nc) where Ng, Nf, and Nc represent refractive indices for g-line, F-line, and C-line, respectively. Additionally, f represents the focal length, and FNO represents the F-number.

The diagrams illustrating the image projecting apparatus in FIGS. 1, 4, and 7 corresponding to the numerical examples of the related exemplary embodiments indicate a state in which a ray bundle that has been emitted from the liquid-crystal element LCD and passed through the glass block (e.g., GB) is projected onto a projection plane (e.g., screen) by using the projection lens (e.g., PL) to display an enlarged image. In FIGS. 1, 4, and 7, a light source and an illumination optical system for illuminating the liquid-crystal display element with light from the light source are not illustrated. The light source emits white light (substantially full range in the visible light). The illumination optical system includes a color separation optical system for separating the light from the light source into red, green, and blue light components, a polarization converting element array for aligning polarization directions of the light from the light source, and an integrator for making the illumination on the liquid-crystal display element uniform. The white-light light source and color separation optical system can be replaced with three light sources, one light source emitting a red, green, or blue light component. The integrator can include a plurality of so-called fly-eye lens arrays, in which minute optical elements can be arranged two-dimensionally, or a plurality of cylindrical lens arrays. In the exemplary embodiments described below, the liquid-crystal display element can be a reflective liquid-crystal display element. However, the liquid-crystal display element can be a transmissive liquid-crystal display element or a micromirror array, in which minute mirrors can be arranged two-dimensionally or one-dimensionally.

In the image projecting apparatus in the first to third exemplary embodiments, a projection optical system refers to a combination of the projection lens (e.g., PL, PLa, PLb) and the glass block (e.g., GB, GBa, GBb) (which for example can include a plurality of cube prisms) functioning as a combining optical system for combining image light components corresponding to different colors emitted from the liquid-crystal display elements. Thus, the projection optical system refers to an optical system for projecting image light from the liquid-crystal display elements onto a projection plane (which is disposed in a substantially conjugate relation with the liquid-crystal display elements). The glass block (e.g., GB) can include a polarizing plate or a wavelength-selective retardation plate (which changes the polarization direction of part of red, green, and blue light components by 90 degrees and does not change the polarization directions of the remaining components), in addition to a color combining system (e.g., a prism having a polarization separating film used as a color combining prism or dichroic prism). Moreover, the glass block (e.g., GB) can include a plurality of optical elements that has substantially no optical power and that can have a focal length that is 100 or more times, typically, 1000 or more times that of the entire system or can include a single optical element that has substantially no optical power.

Stop (e.g., STO, STOa, STOb) is a stop for a lens unit that has a positive power. In the exemplary embodiments described below, in order to facilitate the illumination distribution on a screen uniform, a multilayer coating (antireflection coating) can be applied to each lens surface.

The exemplary embodiments described below can achieve a wide angle of view and maintain a long back focus by using a so-called negative lead type lens system, in which a lens unit that has a negative refractive power is arranged in the front.

In such exemplary embodiments, the following conditional expression (1) can be satisfied:

$$0.02 < \Sigma\{(Nf)i-(Nc)i\} \times Di/f < 0.15 \qquad (1)$$

where $(Nf)i$ represents the refractive index of a glass material of an ith optical element for F-line, the ith optical element being counted from the enlargement conjugate side (which is a side adjacent to a projection plane (e.g., screen) in the case of a liquid crystal projector) among the optical elements having almost no power (i.e., the optical elements having substantially no optical power), including the color combining optical system for combining the image light components corresponding to different colors from the liquid-crystal display elements, polarizing plate, and wavelength-selective retardation plate; $(Nc)i$ represents the refractive index of the material of the ith optical element for C-line; $Di$ represents the material thickness of the ith optical element along the optical axis (i.e., a length in the optical axis), where $Di$ is positive when the ith optical element is disposed at a position in which a ray bundle that has passed through the ith optical element converges and negative when the ith optical element is disposed at a position in which the ray bundle diverges, and the ray bundle refers to a ray bundle that emerge from a first point on the reduction conjugate side and then converges on a second point on the enlargement conjugate side; and f represents the focal length of the entire projection optical system from the liquid-crystal display elements to the projection plane (e.g., screen).

Conditional expression (1) indicates the amount of axial chromatic aberration occurring in the glass block GB shown in FIG. 1 or other Figures. The amount of axial chromatic aberration increases with an increase in the dispersion of the glass material of the glass block (e.g., GB) and in the length of the glass block (e.g., GB) in the optical axis. Note that D, which represents the length of an optical element in the optical axis in conditional expression (1), is, at a position where the glass block (e.g., GB) is disposed, positive when a light beam converges toward a focal plane and negative when the light beam diverges.

Arranging the glass block at a position where the light beam converges toward the focal plane produces an effect related to that achieved by a negative lens on the axial chromatic aberration. Satisfying conditional expression (1) allows the effect to be obtained by an appropriate amount.

Examples of the optical elements can include a color separation prism (e.g., prism having a polarization separating film or dichroic prism) configured to separate white light into light components (e.g., red, green, and blue components) having different wavelengths from each other, a color combining prism (e.g., prism having a polarization separating film or dichroic prism) configured to combine the light components (e.g., red, green, and blue components), which can have different ranges of wavelengths from each other, polarizing plate, and retardation plate. Each of the optical elements can have substantially no optical power at an entrance face and an exit face. However, the optical element can have an optical power. In the case where the optical element is curved, the optical element can have a positive power at the entrance face, and can have either a positive or negative power at the exit face.

To obtain the effect achieved by a negative lens more sufficiently, the following conditional expression (2) can be satisfied:

$$0.025 < \Sigma\{(Nf)i-(Nc)i\} \times Di/f < 0.10 \qquad (2)$$

Furthermore, the following relation expressions (3) and (4) can be satisfied:

$$\theta p, av-(0.648-0.001682 \times vp, av) > 0 \qquad (3)$$

$$\theta p, av-(0.589-0.000584 \times vp, av) < 0 \qquad (4)$$

where $$\theta p, av = \Sigma(\theta p/fp)/\Sigma(1/fp), \nu p, av = \Sigma(\nu p/fp)/\Sigma(1/fp), \text{ and}$$
$$\theta p = \{(Ng)p - (Nf)p\}/\{(Nf)p - (Nc)p\}$$

where fp represent the focal length of a pth positive lens, the pth positive lens being counted from the enlargement conjugate side in the projection optical system; νp represents the Abbe number of the glass material of the pth positive lens for d-line; (Ng)p represents the refractive index of the pth positive lens for g-line; (Nf)p represents the refractive index of the pth positive lens for the F-line; and (Nc)p represents the refractive index of the pth positive lens for the C-line. The relation expressions define that all positive lenses included in the projection optical system have predetermined anomalous dispersion properties.

If conditional expression (3) is not satisfied, the anomalous dispersion properties can be insufficient, so that secondary spectrum may not be corrected sufficiently. If conditional expression (4) is not satisfied, the anomalous dispersion properties can be excessive, and therefore, secondary spectrum may not be corrected sufficiently, either.

To satisfy both conditional expressions (3) and (4), at least one positive lens (anomalous dispersion positive lens) among one or more positive lenses included in the lens unit, which can have a positive power, can be formed from an anomalous dispersion glass that can satisfy the following condition:

$$\theta p - (0.6438 - 0.001682 \times \nu p) > 0.018 \quad (5)$$

Additionally, a single surface or both surfaces of the anomalous dispersion positive lens can be joined to a negative lens that can satisfy the following condition:

$$\nu ab < 50 \quad (6)$$

where νab represents the Abbe number of the negative lens joined to the anomalous dispersion positive lens for the d-line. The structure described above allows high-order chromatic aberration to be reduced sufficiently.

Additionally, in the projection optical system in the exemplary embodiments, at least one optical element that has substantially no optical power can satisfy the following conditional expression:

$$(Nf)i - (Nc)i > 0.01 \quad (7)$$

To obtain the anomalous dispersion properties more sufficiently in the entire projection optical system, the following conditional expression (8) can be satisfied:

$$\theta p, av - (0.655 - 0.001682 \times \nu p, av) > 0 \quad (8)$$

To sufficiently correct and/or reduce other aberration, including spherical aberration, and distortion, occurring in the anomalous dispersion positive lens or other related or equivalent errors as known by one of ordinary skill in the relevant art, the projection optical system includes at least one aspherical lens.

First Exemplary Embodiment

The projection lens in the first exemplary embodiment includes, in order from an enlargement side, negative, positive, and positive powers, as illustrated in FIG. 1.

A first lens unit L1 includes, in order from the enlargement side, an aspherical lens (which has both aspherical surfaces, although a single aspherical surface can be used) and a negative lens, which can have a strong power. The strong-power negative lens mainly functions to widen an angle of view of the entire system. The aspherical lens mainly serves to sufficiently correct and/or reduce distortion aberration occurring in the strong-power negative lens. As is apparent from the graph showing the distortion aberration in FIG. 2, the distortion aberration is sufficiently corrected and/or reduced throughout the screen.

A second lens unit L2 includes two positive lenses. The two positive lenses are disposed at positions that exhibit large heights h and H where h and H represent the height of a paraxial ray and the height of a chief ray that have passed through a lens surface from the optical axis, respectively.

The second lens unit L2 functions to correct and/or reduce the distortion aberration occurring in the first lens unit L1 and astigmatism, spherical aberration, and coma aberration occurring in a third lens unit L3 (described later) in an auxiliary manner.

The third lens unit L3 includes an anomalous-dispersion positive lens that has a strong positive power and that is joined to a negative lens, a negative meniscus lens, an aspherical lens, and a positive lens, which can have a strong positive power at a surface adjacent to a reduction conjugate side.

The anomalous-dispersion positive lens which has the strong power effectively performs an action of facilitating the occurrence of-chromatic aberration in the short-wavelength range (facilitating the focal length of light in the short-wavelength range to be shorter than that of light in the other range) and also effectively corrects and/or reduces high-order chromatic aberration at a joint surface that is joined to the negative lens.

The negative meniscus lens effectively corrects and/or reduces spherical aberration and coma aberration occurring in the anomalous dispersion lens which has the strong positive power.

The aspherical lens can be disposed at a position that has equivalently large heights h and H. The aspherical lens chiefly deals with correction and/or reduction of astigmatism, and can correct or reduce the error in spherical aberration and coma aberration in an auxiliary manner. As is apparent from the graph showing the astigmatism in FIG. 2, the astigmatism is sufficiently corrected throughout the screen.

The positive lens which has the strong positive power at the surface adjacent to the reduction conjugate side serves to reduce a combined refractive index of the lens units and to correct and/or reduce astigmatism and coma aberration in an auxiliary manner. Additionally, a strong power of the surface adjacent to the reduction conjugate side effectively corrects distortion aberration at a position that exhibits a larger height H.

The glass block GB which is disposed at the most reduction side has an achromatic effect related to that achieved by a negative lens by satisfying conditional expression (1). The effect of facilitating the occurrence of chromatic aberration in the short-wavelength range achieved by the anomalous dispersion lens and the achromatic effect achieved by the glass block GB are well balanced, thus effectively correcting and/or reducing the axial chromatic aberration over the full range of the visible light, as illustrated in FIG. 3.

Second Exemplary Embodiment

In the second exemplary embodiment, the achromatic effect achieved by a glass block GBa is smaller than that in the first exemplary embodiment.

Since the achromatic effect by the glass block GBa is small, the effect of facilitating the occurrence of chromatic aberration in the short-wavelength range performed by an anomalous dispersion positive lens included in a third lens unit can be small. This can result in an insufficiency of an effect of high-order chromatic aberration correction and/or reduction at a joint surface jointed to the negative lens. Therefore, the anomalous dispersion lens can be jointed to a negative meniscus lens to allow both surfaces of the anomalous dispersion lens to have the effect of correcting high-order chromatic aberration.

Third Exemplary Embodiment

The third exemplary embodiment is a zoom lens including six lens units having negative, positive, positive, negative, positive, and positive power, respectively, as illustrated in FIG. 7.

A first lens unit L1b includes a negative meniscus lens that has a convex surface at an enlargement conjugate side, an aspherical lens, a negative lens that has a strong concave surface at the enlargement conjugate side, and a positive lens that has a strong convex surface at the reduction conjugate side.

The negative meniscus lens which has the convex surface at the enlargement conjugate side has a negative power for achieving a wide angle of view at a surface that is adjacent to the reduction conjugate side, the surface having a smaller height H, and a positive power for correcting and/or reducing distortion aberration at a surface, having a larger height H, that is adjacent to the enlargement conjugate side. Each of the aspherical lens and negative lens which has the strong concave surface at the enlargement conjugate side has a strong negative power for achieving a wide angle of view, as in the case of the first lens unit L1 in the first exemplary embodiment, and has the effect of correcting and/or reducing resultant distortion aberration. The positive lens which has the strong convex surface at the reduction conjugate side corrects and/or reduces distortion aberration by having the convex surface at the position that exhibits a larger height H.

A second lens unit L2b is a moving lens unit which includes a single double-convex positive lens. The third lens unit L3b mainly achieves a zooming effect by changing a combined focal length of the first lens unit L1b and second lens unit L2b with respect to a substantially a focal light beam incident from third lens unit L3b to sixth lens unit L6b (described later).

The third lens unit L3b is a moving lens unit includes a single convex positive lens. The third lens unit L3b moves while maintaining a substantially afocal relation among the third lens unit L3b to sixth lens unit L6b.

The fourth lens unit L4b includes a single negative lens and serves to sufficiently hold variations in aberration caused by movement of the fifth lens unit L5b. As illustrated in FIGS. 8 and 9, sufficient optical properties can be achieved at both wide-angle and telephoto ends.

The fifth lens unit L5b includes two anomalous dispersion lenses having strong powers, a first anomalous dispersion lens being a combination lens (e.g., cemented or combination lens) including a negative lens, and includes an aspherical lens. The fifth lens unit L5b serves to facilitate the occurrence of chromatic aberration in the short-wavelength range and to correct high-order chromatic aberration and astigmatism, as in the case of the third lens unit L3b in the first exemplary embodiment.

Moving the fifth lens unit L5b changes a combined focal length of the fifth lens unit L5b and sixth lens unit L6b and changes an angular magnification of an afocal system of the third lens unit L3b to sixth lens unit L6b, thus realizing a zooming effect, as well as the second lens unit L2b.

The sixth lens unit L6b functions to weaken a combined refractive index of the first lens unit L1b to fifth lens unit L5b and facilitates a wider angle of view and a larger diameter of a lens.

A glass block GBb disposed at the most reduction side has the achromatic effect, as in the case of the first exemplary embodiment. Thus, balancing the achromatic effect and the effect of facilitating the occurrence of chromatic aberration achieved by the anomalous dispersion lens well and sufficiently maintaining the conjugate relationship between the moving lens units corrects and/or reduces the axial chromatic aberration at both wide-angle and telephoto ends, as illustrated in FIG. 10.

An image projecting apparatus (e.g., liquid-crystal projector) using the projection optical system according to the first to third exemplary embodiment is described below. The image projecting apparatus includes three image display elements corresponding to three colors (red, green, and blue), an illumination optical system for illuminating the three image display elements with light from a light source, and a projection optical system for projecting image light components emitted from the three image display elements. Each of the image display elements can be a liquid-crystal display element and can be a reflective liquid-crystal display element. The illumination optical system includes: a polarization converting element configured to convert unpolarized light from the light source into linear polarized light; an integrator configured to enhance the uniformity of the illumination on the liquid-crystal display elements; and a color separation optical system configured to separate white light from the light source into red, green, and blue light components. The integrator includes a cylindrical array and/or a fly-eye lens array. The projection optical system includes a color combining optical system configured to combine the image light components from the three image display elements and a projection lens (which can include a mirror). The color combining optical system can include a polarization beam splitter, dichroic prism, wavelength-selective phase-difference plate, and polarizing plate. Each of the optical elements can have substantially no optical power (can have a focal length that is 100 or more times, typically, 1000 or more times that of the projection optical system). In contrast to this, in the case where the optical element (in particular, a cube prism used in the color separation or color combination in the image projecting apparatus) has an optical power (more than zero), i.e., has a finite curvature, a single kind of optical power for all light components corresponding to different colors (red, green, blue light components) can be used. Typically, however, the optical element can have at least two kinds of surfaces having different optical powers (more typically, three surfaces having different optical powers) for a surface for facilitating the red light component, the green light component, and the blue light component to pass therethrough.

The image display elements included in the image projecting apparatus can be light converting elements (mirror array) containing a plurality of minute reflective elements or can be transmissive image display elements (e.g., transmissive liquid-crystal display elements). The image display elements can be a single image display element.

In the exemplary embodiments, the projection lens (e.g., PL, PLa, PLb) can be formed integrally with the main body of the liquid-crystal projector (image projecting apparatus). However, the projection lens (e.g., PL, PLa, and PLb) can be removably attached to the main body of the projector (e.g., liquid-crystal) with a connection member (not shown) disposed therebetween. Although all units in the numerical examples are expressed in millimeters, it is to be understood, of course, that a numerical example related to the numerical examples, i.e., a numerical example in which the units of the numerical examples are changed from millimeters to centimeters, meters, and micrometers is included in the scope of the exemplary embodiments.

According to the exemplary embodiments described above, a projection lens configured to enlarge and project a display image formed on the basis of a display element (e.g., liquid-crystal) on a projection plane (e.g., screen) can be made compact and light, and the display image can be projected brightly. Additionally, according to the exemplary embodiments described above, even in the case of a high-definition image, an image whose chromatic aberration is sufficiently corrected and/or reduced can be obtained in a system including a small number of lenses, and a projection lens having an excellent resolution can be provided. In other words, a projection lens and projection optical system can be compact while both axial chromatic aberration and lateral chromatic aberration can be sufficiently corrected. Therefore, a projection optical system that has sufficient optical performance throughout the screen and that can be used for a projector (e.g., liquid-crystal) and an image projecting apparatus using the projection optical system can be provided.

TABLE 1

FIRST NUMERICAL EXAMPLE

Focal length f: 10.11    FNO: 2.48    Half Angle of View: 46.13

| Surface No. | (r)i | (d)i | (Nd)i | (v d)i | (f)i | (θ gF)i |
|---|---|---|---|---|---|---|
| 1 |  | 660.0000 |  |  |  |  |
| 2 | 142.6862 | 5.0000 | 1.4917 | 57.40 | −98.1541 | 0.5473 |
| 3 | 35.7460 | 24.4791 |  |  |  |  |
| 4 | −109.0855 | 2.4000 | 1.7170 | 47.93 | −30.4652 | 0.5605 |
| 5 | 27.7178 | 70.0622 |  |  |  |  |
| 6 | 1040.8551 | 5.0414 | 1.6968 | 55.53 | 107.2050 | 0.5434 |
| 7 | −80.6485 | 0.1000 |  |  |  |  |
| 8 | 76.0690 | 3.7488 | 1.7440 | 44.79 | 144.0940 | 0.5655 |
| 9 | 253.4624 | 50.1225 |  |  |  |  |
| 10 | (STO) | 11.5385 |  |  |  |  |
| 11 | 43.8284 | 1.1000 | 1.6700 | 39.27 | −26.3609 | 0.5816 |
| 12 | 12.5093 | 10.0241 | 1.4970 | 81.55 | 16.9411 | 0.5375 |
| 13 | −19.0433 | 1.4211 |  |  |  |  |
| 14 | −17.0195 | 1.2000 | 1.8340 | 37.16 | −35.0583 | 0.5776 |
| 15 | −41.7052 | 0.6734 |  |  |  |  |
| 16 | 45.3453 | 2.5000 | 1.5300 | 55.80 | −208.9160 | 0.5500 |
| 17 | 31.5889 | 3.5983 |  |  |  |  |
| 18 | 1438.6197 | 6.9907 | 1.7170 | 47.93 | 29.7270 | 0.5605 |
| 19 | −21.6883 | 1.0000 |  |  |  |  |
| 20 |  | 3.0000 | 1.4875 | 70.24 |  | 0.5300 |
| 21 |  | 33.5600 | 1.6989 | 30.13 |  | 0.6030 |
| 22 |  | 1.1979 |  |  |  |  |

Aspheric Constant

| Surface No. | K | A (4th) | B (6th) | C (8th) | D (10th) | E (12th) |
|---|---|---|---|---|---|---|
| 1 |  | 7.0191E−06 | −1.7669E−09 | −9.2196E−13 | 7.2043E−16 |  |
| 2 | 1.1037E−02 | 3.8800E−06 | 9.7075E−09 | −1.7825E−11 | 2.6166E−15 |  |
| 16 |  | −7.9860E−06 | 2.2701E−09 | −5.4005E−10 | 4.0104E−12 | −3.0994E−15 |
| 17 | 2.8163E−01 | 5.6282E−07 | −5.8136E−08 | −2.4186E−10 | 1.8251E−12 | −5.1247E−16 |

TABLE 2

SECOND NUMERICAL EXAMPLE

Focal length f: 10.10    FNO: 2.24    Half Angle of View: 46.19

| Surface No. | (r)i | (d)i | (Nd)i | (v d)i | (f)i | (θ gF)i |
|---|---|---|---|---|---|---|
| 1 |  | 660.0000 |  |  |  |  |
| 2 | 136.4489 | 5.0000 | 1.4917 | 57.40 | −95.6793 | 0.5473 |
| 3 | 34.6561 | 25.6302 |  |  |  |  |
| 4 | −107.1695 | 2.4000 | 1.7440 | 44.79 | −28.5722 | 0.5655 |
| 5 | 26.9303 | 80.0000 |  |  |  |  |
| 6 | 277.9802 | 3.9266 | 1.6584 | 50.88 | 114.5180 | 0.5560 |
| 7 | −103.4804 | 0.1000 |  |  |  |  |
| 8 | 53.6446 | 3.7247 | 1.6968 | 55.53 | 115.2350 | 0.5434 |
| 9 | 155.8037 | 36.2515 |  |  |  |  |
| 10 | (STO) | 13.4930 |  |  |  |  |
| 11 | 46.9977 | 1.1000 | 1.7495 | 35.28 | −30.3747 | 0.5869 |
| 12 | 15.2436 | 10.3031 | 1.4970 | 81.55 | 17.5334 | 0.5375 |
| 13 | −15.8675 | 1.2000 | 1.8340 | 37.16 | −30.7460 | 0.5776 |
| 14 | −42.6681 | 4.2354 |  |  |  |  |
| 15 | 59.5814 | 2.5000 | 1.5300 | 55.80 | −98.8565 | 0.5500 |

TABLE 2-continued

SECOND NUMERICAL EXAMPLE

| | | | | | | |
|---|---|---|---|---|---|---|
| 16 | 27.5270 | 2.3874 | | | | |
| 17 | 54.2361 | 7.7482 | 1.5831 | 59.37 | 30.3759 | 0.5434 |
| 18 | −25.0495 | 2.0000 | | | | |
| 19 | | 3.0000 | 1.4875 | 70.24 | — | 0.5300 |
| 20 | | 30.0000 | 1.6074 | 56.82 | — | 0.5483 |
| 21 | | 2.7158 | | | | |

Aspheric Constant

| Surface No. | K | A (4th) | B (6th) | C (8th) | D (10th) | E (12th) |
|---|---|---|---|---|---|---|
| 1 | | 6.9901E−06 | −3.8524E−09 | 1.1611E−12 | −8.2801E−18 | |
| 2 | −2.8573E−01 | 4.5340E−06 | 5.9196E−09 | −1.7940E−11 | 6.4035E−15 | |
| 16 | | 1.5760E−06 | −1.3447E−08 | −2.1135E−10 | 9.8786E−13 | −1.4715E−15 |
| 17 | 5.2904E−01 | −3.6828E−06 | −3.3572E−08 | −1.8962E−10 | 8.4010E−13 | −1.2710E−15 |

TABLE 3

THIRD NUMERICAL EXAMPLE

Focal length f: 25.55~38.  FNO: 1.85~2.35  Half Angle of View: 25.51~17.65

| Surface No. | (r)i | (d)i | (Nd)i | (ν d)i | (f)i | (θ gF)i |
|---|---|---|---|---|---|---|
| 1 | | 2100.0000 | | | | |
| 2 | 42.2400 | 2.5000 | 1.8052 | 25.43 | −50.2040 | 0.6161 |
| 3 | 20.1929 | 8.6881 | | | | |
| 4 | 151.4310 | 3.5000 | 1.5300 | 55.80 | −109.8220 | 0.5500 |
| 5 | 41.8202 | 9.0362 | | | | |
| 6 | −24.4999 | 2.0000 | 1.4875 | 70.24 | −45.1557 | 0.5300 |
| 7 | 229.5436 | 1.3247 | | | | |
| 8 | −801.1141 | 6.7918 | 1.8340 | 37.16 | 60.4614 | 0.5776 |
| 9 | −47.8781 | (Variable) | | | | |
| 10 | 67.0360 | 6.0569 | 1.8340 | 37.16 | 69.6008 | 0.5776 |
| 11 | −433.4060 | (Variable) | | | | |
| 12 | 42.2390 | 5.7248 | 1.4875 | 70.24 | 102.0800 | 0.5300 |
| 13 | 262.4533 | (Variable) | | | | |
| 14 | (STO) | 1.5922 | | | | |
| 15 | −54.1765 | 2.5000 | 1.7725 | 49.60 | −66.2016 | 0.5520 |
| 16 | 1007.9883 | (Variable) | | | | |
| 17 | −49.1973 | 1.4000 | 1.8340 | 37.16 | −23.6483 | 0.5776 |
| 18 | 33.6662 | 7.1575 | 1.4970 | 81.55 | 37.2923 | 0.5375 |
| 19 | −38.5445 | 0.1500 | | | | |
| 20 | 45.2680 | 16.3799 | 1.4970 | 81.55 | 41.2769 | 0.5375 |
| 21 | −33.1601 | 0.1500 | | | | |
| 22 | −99.7686 | 4.0000 | 1.5300 | 55.80 | −1485.8100 | 0.5500 |
| 23 | −115.7702 | (Variable) | | | | |
| 24 | 71.6503 | 6.1345 | 1.4875 | 70.24 | 99.0746 | 0.5300 |
| 25 | −145.3771 | 0.1500 | | | | |
| 26 | | 29.7600 | 1.7552 | 27.51 | — | 0.6136 |
| 27 | | 32.7600 | 1.5163 | 64.14 | — | 0.5353 |
| 28 | | 0.1649 | | | | |

Aspheric Constant

| Surface No. | K | A (4th) | B (6th) | C (8th) | D (10th) | E (12th) |
|---|---|---|---|---|---|---|
| 1 | −8.6529E−01 | 3.1986E−05 | −8.4498E−08 | 4.1972E−10 | −1.1276E−12 | 1.6887E−15 |
| 2 | −4.3291E+00 | 2.8335E−05 | −1.0015E−07 | 4.1318E−10 | −1.2298E−12 | 1.8296E−15 |
| 16 | −6.5866E+01 | −3.2300E−05 | 2.2949E−08 | −3.2797E−11 | 1.4792E−13 | −1.2046E−16 |
| 17 | −7.9133E+00 | −2.0380E−05 | 6.3226E−09 | 3.7525E−11 | −2.8798E−14 | 4.8329E−17 |

Surface Distance Variable Sections

| Surface No. | Wide-Angle End | Telephoto End |
|---|---|---|
| 9 | 16.79 | 0.5 |
| 11 | 27.84 | 11.74 |
| 13 | 13.99 | 28.46 |
| 16 | 5.79 | 1.85 |
| 23 | 0.5 | 22.37 |

TABLE 4

|  | First Numerical Example | Second Numerical Example | Third Numerical Example | |
| --- | --- | --- | --- | --- |
|  |  |  | Wide-Angle End | Telephoto End |
| Value of Conditional Expressions (1) and (2) $\Sigma\{(Nf)i - (Nc)i\} \times Di/f$ | 0.07915 | 0.03176 | 0.04229 | 0.02821 |
| νp·av | 66.55 | 70.09 | 66.34 | |
| θp·av | 0.5469 | 0.5413 | 0.5482 | |
| Left-Hand Side of Conditional Expression (3) | 0.0108 | 0.0112 | 0.0118 | |
| Left-Hand Side of Conditional Expression (4) | −0.0032 | −0.0068 | −0.0021 | |
| Left-Hand Side of Conditional Expression (5) | 0.0309 (12th Surface) | 0.0309 (12th Surface) | 0.0309 (18th and 20th Surfaces) | |
| Left-Hand Side of Conditional Expression (6) | 39.27 (11th Surface) | 35.28 (11th Surface) 37.16 (13th Surface) | 37.16 (17th Surface) | |
| Left-Hand Side of Conditional Expression (7) | 0.0232 (21st Surface) | 0.0107 (20th Surface) | 0.0275 (26th Surface) | |
| Left-Hand Side of Conditional Expression (8) | 0.0038 | 0.0042 | 0.0048 | |

According to the exemplary embodiments described above, the projection optical system that is made compact while reducing chromatic aberration in the visible light range and the image projecting apparatus using the projection optical system can be provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-131837 filed Apr. 28, 2005, which is hereby incorporated by reference herein in its entirety.

What is claimed is:

1. A projection optical system comprising:
   at least one optical element; and
   at least one positive lens,
   wherein the following expressions are satisfied:

$0.02 < \Sigma_i\{(Nf)i-(Nc)i\} \times Di/f < 0.15$ $\theta p, av-(0.648-0.001682 \times vp, av) > 0$ $\theta p, av-(0.589-0.000584 \times vp, av) < 0$ where $\theta p = \{(Ng)p-(Nf)p\}/\{(Nf)p-(Nc)p\}$ $\theta p, av = \Sigma_p(\theta p/fp)/\Sigma_p(1/fp)$ $vp, av = \Sigma_p(vp/fp)/\Sigma_p(1/fp)$ where
   (Nf)i represents a refractive index of a material of an ith optical element for a F-line, the ith optical element being counted from an enlargement conjugate side in the projection optical system among the at least one optical element;
   (Nc)i represents a refractive index of the material of the ith optical element for a C-line;
   Di represents a material thickness of the ith optical element along an optical axis, wherein the value of Di is positive when a ray bundle that has passed through the ith optical element converges and wherein the value of Di is negative when the ray bundle diverges;
   f represents a focal length of the projection optical system;
   fp represent a focal length of a pth positive lens, the pth positive lens being counted from the enlargement conjugate side in the projection optical system among the at least one positive lens;
   vp represents an Abbe number of a material of the pth positive lens for a d-line;
   (Ng)p represents a refractive index of the pth positive lens for a g-line;
   (Nf)p represents a refractive index of the pth positive lens for the F-line; and
   (Nc)p represents a refractive index of the pth positive lens for the C-line.

2. The projection optical system according to claim 1, wherein the following expression is satisfied:

$0.025 < \Sigma_i\{(Nf)i-(Nc)i\} \times Di/f < 0.100$.

3. The projection optical system according to claim 1, wherein the following expression is satisfied:

$\theta p, av-(0.655-0.001682 \times vp, av) > 0$.

4. The projection optical system according to claim 1, wherein the at least one optical element has substantially no optical power.

5. The projection optical system according to claim 4, wherein the following expression is satisfied:

$(Nf-Nc) > 0.01$ where Nf represents a refractive index of a single optical element for the F-line, the single optical element being among the at least one optical element which has substantially no optical power, and Nc represents a refractive index of the single optical element for the C-line.

6. The projection optical system according to claim 1, wherein the projection optical system includes six lens units having, in order from the enlargement conjugate side, a negative power, positive power, positive power, negative power, positive power, and positive power, respectively,
   the projection optical system has a zooming function performed by driving a plurality of the lens units among the six lens units, and
   the at least one positive lens is arranged within the six lens units.

7. The projection optical system according to claim 6, wherein the plurality of lens units which have positive power include an anomalous dispersion positive lens that satisfies the following condition:

$$\theta p - (0.6438 - 0.001682 \times \nu p) > 0.018.$$

8. The projection optical system according to claim 7, wherein at least one surface of the anomalous dispersion positive lens is joined to a negative lens that satisfies the following condition:

$$\nu ab < 50$$

where $\nu ab$ represents an Abbe number of the negative lens joined to the anomalous dispersion positive lens for the d-line.

9. The projection optical system according to claim 1, wherein a lens disposed on a most enlargement conjugate side among one or more lenses included in the projection optical system is an aspherical lens.

10. The projection optical system according to claim 1, wherein the at least one optical element is at least one prism.

11. The projection optical system according to claim 10, wherein the at least one prism includes a surface having an optical power.

12. An image projecting apparatus comprising:
   at least one image display element; and
   a projection optical system configured to project light from the at least one image display element, the projection optical system including:
      at least one optical element; and
      at least one positive lens,
      wherein the following expressions are satisfied:

$$0.02 < \Sigma_i \{(Nf)i - (Nc)i\} \times Di/f < 0.15$$

$$\theta p, av - (0.648 - 0.001682 \times \nu p, av) > 0$$

$$\theta p, av - (0.589 - 0.000584 \times \nu p, av) < 0$$

where $$\theta p = \{(Ng)p - (Nf)p\} / \{(Nf)p - (Nc)p\}$$

$$\theta p, av = \Sigma_p (\theta p/fp) / \Sigma_p (1/fp)$$

$$\nu p, av = \Sigma_p (\nu p/fp) / \Sigma_p (1/fp)$$

where
   (Nf)i represents a refractive index of a material of an ith optical element for a F-line, the ith optical element being counted from an enlargement conjugate side in the projection optical system among the at least one optical element;
   (Nc)i represents a refractive index of the material of the ith optical element for a C-line;
   Di represents a material thickness of the ith optical element along an optical axis, wherein the value of Di is positive when a ray bundle that has passed through the ith optical element converges and wherein the value of Di is negative when the ray bundle diverges;
   f represents a focal length of the projection optical system;
   fp represent a focal length of a pth positive lens, the pth positive lens being counted from the enlargement conjugate side in the projection optical system among the at least one positive lens;
   νp represents an Abbe number of a material of the pth positive lens for a d-line;
   (Ng)p represents a refractive index of the pth positive lens for a g-line;
   (Nf)p represents a refractive index of the pth positive lens for the F-line; and
   (Nc)p represents a refractive index of the pth positive lens for the C-line.

13. The image projecting apparatus according to claim 12, wherein the at least one image display element comprises three reflective liquid-crystal display elements,
   the projection optical system is configured to combine image light components from the three liquid-crystal display elements into combined image light by using the at least one optical element and to project the combined image light by using the at least one positive lens, and
   the at least one optical element comprises a polarizing beam splitter.

14. An image projecting apparatus comprising:
   a plurality of image display elements;
   an illumination optical system configured to illuminate the plurality of image display elements with a plurality of light components corresponding to different colors by using light from a light source;
   a color combining optical system configured to combine a plurality of light components corresponding to different colors emitted from the plurality of image display elements into combined light; and
   a projection optical system configured to project the combined light combined by the color combining optical system onto a projection plane,
   wherein the color combining optical system includes at least one prism,
   the projection optical system includes at least one positive lens, and
   the following expressions are satisfied:

$$0.02 < \Sigma_i \{(Nf)i - (Nc)i\} \times Di/f < 0.15$$

$$\theta p, av - (0.648 - 0.001682 \times \nu p, av) > 0$$

$$\theta p, av - (0.589 - 0.000584 \times \nu p, av) < 0$$

where $$\theta p = \{(Ng)p - (Nf)p\} / \{(Nf)p - (Nc)p\}$$

$$\theta p, av = \Sigma_p (\theta p/fp) / \Sigma_p (1/fp)$$

$$\nu p, av = \Sigma_p (\nu p/fp) / \Sigma_p (1/fp)$$

where
   (Nf)i represents a refractive index of a material of an ith prism for a F-line, the ith prism being counted from an enlargement conjugate side in the projection optical system among the at least one prism;
   (Nc)i represents a refractive index of the material of the ith prism for a C-line;
   Di represents a material thickness of the ith prism along an optical axis, wherein the value of Di is positive when a ray bundle that has passed through the ith prism converges and wherein the value of Di is negative when the ray bundle diverges;
   f represents a focal length of the projection optical system;
   fp represent a focal length of a pth positive lens, the pth positive lens being counted from the enlargement conjugate side in the projection optical system among the at least one positive lens;
   νp represents an Abbe number of a material of the pth positive lens for a d-line;
   (Ng)p represents a refractive index of the pth positive lens for a g-line;
   (Nf)p represents a refractive index of the pth positive lens for the F-line; and
   (Nc)p represents a refractive index of the pth positive lens for the C-line.

15. The projection optical system according to claim 6, wherein a first lens unit includes a negative meniscus lens that has a convex surface at an enlargement conjugate side, an aspherical lens, a negative lens that has a concave surface at the enlargement conjugate side, and a positive lens that has a convex surface at the reduction conjugate side.

16. The projection optical system according to claim 15, wherein a second lens unit is configured to be a moving lens unit which includes a single double-convex positive lens.

17. The projection optical system according to claim 16, wherein a third lens unit is configured to be a moving lens unit which includes a single convex positive lens, and wherein the third lens unit moves while maintaining a substantially afocal relation among a plurality of the six lens units.

18. The projection optical system according to claim 17, wherein a fourth lens unit includes a single negative lens and serves to reduce variations in aberration caused by movement of a fifth lens unit.

19. The projection optical system according to claim 18, wherein the fifth lens unit, configured to move, includes a first anomalous dispersion combination lens, wherein the first anomalous dispersion combination lens includes a negative lens, and an aspherical lens, and wherein the fifth lens unit is configured to facilitate an occurrence of chromatic aberration in the short-wavelength range and to reduce high-order chromatic aberration and astigmatism.

20. The projection optical system according to claim 19, wherein a sixth lens unit is configured to reduce a combined refractive index of the first lens unit to the fifth lens unit.

* * * * *